US008018874B1

(12) United States Patent
Owechko

(10) Patent No.: US 8,018,874 B1
(45) Date of Patent: Sep. 13, 2011

(54) NETWORK OPTIMIZATION SYSTEM IMPLEMENTING DISTRIBUTED PARTICLE SWARM OPTIMIZATION

(75) Inventor: Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 12/387,752

(22) Filed: May 6, 2009

(51) Int. Cl.
*H04L 12/28* (2006.01)

(52) U.S. Cl. ............ 370/254; 706/10; 706/15; 709/201; 709/220

(58) Field of Classification Search .................. None
See application file for complete search history.

(56) References Cited

U.S. PATENT DOCUMENTS

| 5,887,143 | A  | * | 3/1999  | Saito et al. ................. 709/248 |
| 7,599,894 | B2 | * | 10/2009 | Owechko et al. ............. 706/14  |
| 2005/0196047 | A1 | * | 9/2005 | Owechko et al. ............. 382/224 |
| 2007/0019865 | A1 | * | 1/2007 | Owechko et al. ............. 382/224 |
| 2007/0208677 | A1 | * | 9/2007 | Goldberg et al. .............. 706/13 |

OTHER PUBLICATIONS

Scriven, I.; Lewis, A.; Ireland, D.; Junwei Lu; , "Decentralised distributed multiple objective particle swarm optimisation using peer to peer networks," Evolutionary Computation, 2008. CEC 2008. (IEEE World Congress on Computational Intelligence), pp. 2925-2928, Jun. 1-6, 2008.*

Hereford, J.M.; , "A Distributed Particle Swarm Optimization Algorithm for Swarm Robotic Applications," Evolutionary Computation, 2006. CEC 2006, pp. 1678-1685.*

Cicirello, V.A.; Mroczkowski, A.; Regli, W.; , "Designing decentralized software for a wireless network environment: evaluating patterns of mobility for a mobile agent swarm," Multi-Agent Security and Survivability, 2005 IEEE 2nd Symposium pp. 49-57, Aug. 30-31, 2005.*

Bo Wang; Zhihai He; , "Distributed Optimization Over Wireless Sensor Networks using Swarm Intelligence," Circuits and Systems, 2007. ISCAS 2007. pp. 2502-2505, May 27-30, 2007.*

Akat, S.B.; Gazi, V.; , "Decentralized asynchronous particle swarm optimization," Swarm Intelligence Symposium, 2008. SIS 2008. IEEE , pp. 1-8, Sep. 21-23, 2008.*

Biazzini, M.; Brunato, M.; Montresor, A.; , "Towards a decentralized architecture for optimization," Parallel and Distributed Processing, 2008. IPDPS 2008. IEEE International Symposium., pp. 1-11, Apr. 14-18, 2008.*

Lorion, Y.; Bogon, T.; Timm, I.J.; Drobnik, O.; , "An Agent Based Parallel Particle Swarm Optimization—APPSO," Swarm Intelligence Symposium, 2009. SIS '09. IEEE , pp. 52-59, Mar. 30-Apr. 2, 2009.*

(Continued)

*Primary Examiner* — Daniel J Ryman
*Assistant Examiner* — Brian Roberts
(74) *Attorney, Agent, or Firm* — Tope-McKay & Assoc.

(57) ABSTRACT

Described is a distributed network optimization system implementing distributed particle swarm optimization, which allows multiple nodes to cooperate in searching efficiently for a set of parameter values that optimizes overall network performance. The system comprises a multi-dimensional network parameter space with software agents configured to operate as a cooperative swarm to locate an objective function optima. The software agents are individually distributed across multiple nodes in the network, and each node processes a portion of each software agent to obtain information regarding the local performance of the software agent. A global measure of network performance is then computed based on sharing of local performance information between nodes, which each node uses to adjust its parameters accordingly. In this manner, the global utility of the network can be optimized using local processing only. Also described is a method of utilizing the system.

24 Claims, 7 Drawing Sheets

OTHER PUBLICATIONS

Tewolde, G.S.; Hanna, D.M.; Haskell, R.E.; , "Multi-swarm parallel PSO: Hardware implementation," Swarm Intelligence Symposium, 2009. SIS '09. IEEE , pp. 60-66, Mar. 30-Apr. 2, 2009.*

Chauhan, N.C.; Aggarwal, D.; Banga, R.; Mittal, A.; Kartikeyan, M.V.; , "Parallelization of Particle Swarm Optimization and Its Implementation on Scalable Multi-core Architecture," Advance Computing Conference, 2009. IACC 2009. IEEE International , pp. 392-397, Mar. 6-7, 2009.*

Farmahini-Farahani, A.; Laali, M.; Moghimi, A.; Fakhraie, S.M.; Safari, S.; , "Mesh architecture for hardware implementation of Particle Swarm Optimization," Intelligent and Advanced Systems, 2007. ICIAS 2007. International Conference pp. 1300-1305, Nov. 25-28, 2007.*

Bo Li; Koichi Wada; , "Parallelizing particle swarm optimization," Communications, Computers and signal Processing, 2005. PACRIM. 2005 IEEE Pacific Rim Conference, pp. 288-291, Aug. 24-26, 2005.*

R.C. Eberhart and Y. Shi, "Particle Swarm Optimization: Developments, Applications, and Resources," Proceedings of IEEE Congress on Evolutionary Computation (CEC 2001), Korea, 2001.

Frans van den Bergh, et al., "A Cooperative Approach to Particle Swarm Optimization," Special issue of IEEE Trans. On Evol. Computation on Particle Swarm Optimization, vol. 8, No. 3, Jun. 2004, pp. 225-239.

S. Medasani and Y. Owechko, "Possibilistic Particle Swarms for Optimization," Proceedings 5673 of SPIE/IST Symposium on Electronic Imagining, San Jose, 2005.

Y. Owechko, S. Medasani, and N. Srinivasa, "Classifier Swarms for Human Detection in Infrared Imagery," IEEE Conference on Computer Vision and Pattern Recognition, Washington, D.C., 2004.

Y. Owechko and S. Medasani, "A Swarm-Based Volition/Attention Framework for Object Recognition," IEEE Conference on Computer Vision and Pattern Recognition, San Diego, 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko, "Multi-View Classifier Swarms for Pedestrian Detection and Tracking," IEEE Conference on Computer Vision and Pattern Recognition, San Diego, 2005.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.J. Fregly, R. T. Haftka, and A.D. George, "Parallel Global Optimization with the Particle Swarm Algorithm," Int. J. Numerical Methods in Engineering, 61:2296-2315, 2004.

J. Kennedy and W.M. Spears, "Matching Algorithms to Problems: An Experimental Test of the Particle Swarm and Some Genetic Algorithms on the Mulimodal Problem Generator," Proceedings of IEEE Inter. Conf. on Evolutionary Computation, 78-83, 1998.

* cited by examiner

NETWORK OPTIMIZATION SYSTEM IMPLEMENTING DISTRIBUTED PARTICLE SWARM OPTIMIZATION

BACKGROUND OF THE INVENTION (1) Field of Invention

The present invention relates to a distributed network optimization system and, more particularly, to a system implementing distributed particle swarm optimization that allows multiple nodes to cooperate in searching efficiently for a set of parameter values that optimizes overall network performance.

(2) Description of Related Art

The present invention is related to a network optimization system. Currently available network optimization systems utilize a "greedy" approach in which each node attempts to optimize its own performance without taking into consideration other nodes in the network. Such existing systems are known to be sub-optimal in that they do not optimize the global network.

In addition, work has been performed in the area of distributed global network optimization based on convex optimization and game theory. However, the disadvantage of convex optimization lies in its assumption that the utility function is convex, which is overly restrictive. Furthermore, game theoretic approaches have not yet demonstrated quality performance and lack a general framework for designing incentives for cooperative behavior.

Thus, a continuing need exists for a distributed network optimization system without central control which allows multiple nodes to cooperate in order to optimize overall network performance, while handling high dimensional, non-convex, and noisy global network utility functions.

SUMMARY OF THE INVENTION

The present invention relates to a distributed network optimization system which implements distributed particle swarm optimization allowing multiple nodes to cooperate in searching efficiently for a set of parameter values that optimizes overall network performance.

The distributed network optimization system comprises a plurality of nodes which form a network. The network includes a multi-dimensional network parameter space and a plurality of software agents which are configured to operate as a cooperative swarm in the network to locate an objective function optima. Each agent is assigned an initial velocity vector to explore the multi-dimensional network parameter space. Additionally, each agent is configured to perform at least one iteration, the iteration being a search in the multi-dimensional network parameter space for a potential objective function optima. Each agent keeps track of a first position vector representing a current best solution that the agent has identified and a second position vector used to store the current global best solution among all agents, with the velocity and position vectors changing probabilistically. Each software agent calculates local utility values representing local performance values at each node of the network, and the plurality of software agents are configured to be individually distributed across the plurality of nodes, wherein a portion of each software agent is processed at each node, such that each node processes its portion of the software agent independently to obtain information regarding the local performance of the software agent.

In another aspect, the network parameter space is factored into node-specific subspaces.

In another aspect, the portions of the software agents are processed at each node in parallel using synchronized node clocks.

In another aspect, each node shares the local utility values for its software agents with all other nodes.

In yet another aspect, each node computes a global network utility value for each software agent based on sharing of local utility values.

In another aspect, each node updates the positions of the software agents in its node-specific subspaces based on the global network utility value for each software agent.

In another aspect, each node updates the positions of the software agents in its node-specific subspaces according to the following technique:

$$v_{pnd}(t+1) = w v_{pnd}(t) + c_1 q_1 [y_{pnd}(t) - x_{pnd}(t)] + c_2 q_2 [y_{nd}^G(t) - x_{pnd}(t)]$$

$$x_{pnd}(t+1) = x_{pnd}(t) + v_{pnd}(t+1)$$

where $x(t)$ and $v(t)$ are the position and velocity vectors at time t, y represents the current best solution found, $y^G$ represents the current global best solution found, $c_1$ and $c_2$ are parameters that weight the influence of their respective terms, w is a momentum constant that prevents premature convergence, and where $q_1$ and $q_2$ are random variables that allow the agents to better explore the multi-dimensional network parameter space, and where p is the particle index, n is the node index, and d is the local parameter index, wherein each index represents a dimension of the multi-dimensional network parameter space.

In another aspect, each node updates the positions of the software agents in its node-specific subspaces in parallel with the other nodes in order to optimize global network utility.

As can be appreciated by one in the art, the present invention comprises a method for using the system described herein.

Finally, as can be appreciated by one in the art, the present invention also comprises a computer program product embodying the system described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
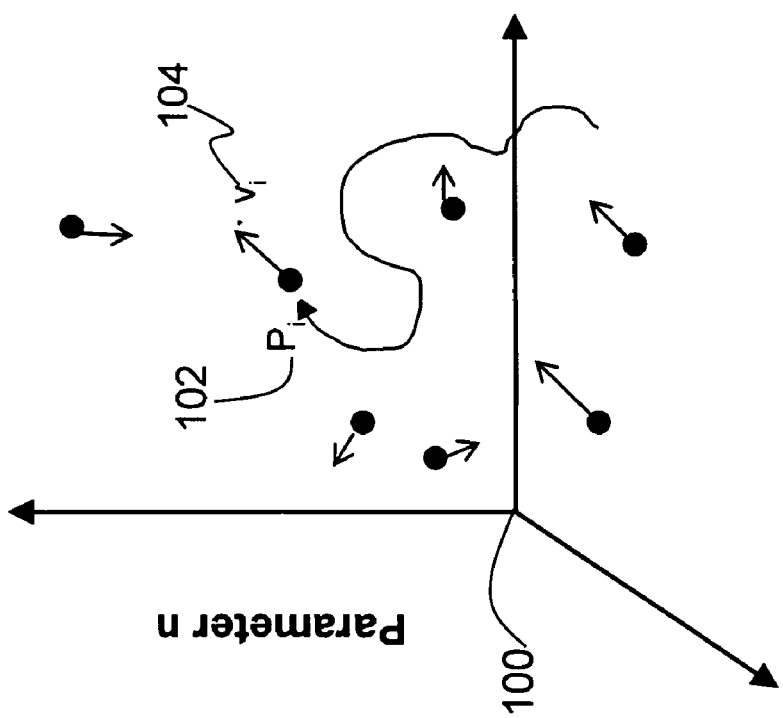
FIG. 1 is an illustration modeling particle swarm optimization.

The present invention relates to a distributed network optimization system and, more particularly, to a system implementing distributed particle swarm optimization that allows multiple nodes to cooperate in searching efficiently for a set of parameter values that optimizes overall network performance. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a distributed network optimization system for optimizing overall network performance utilizing a distributed particle swarm optimization technique. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Introduction

The present invention relates to a distributed system for optimizing network performance utilizing a distributed particle swarm optimization (DPSO) technique. DPSO is a novel approach for implementing particle swarm optimization (PSO), a simple yet powerful population-based algorithm that is effective for optimization of a wide range of functions. PSO has its roots in theories of social interaction. As in human and animal societies, the well-being of the group and its members is increased by giving the members motivation to act altruistically. PSO models the exploration of a multi-dimensional solution space by a "swarm" of software agents, or particles, where the success of each particle has an influence on the dynamics of other members of the swarm.

DPSO is a method for adapting PSO for distributed optimization problems. In the case of PSO and DPSO algorithms, each particle in the swarm resides in a multi-dimensional solution space. The positions of the particles represent candidate problem solutions, or in the case of wireless networks, vectors of multi-node parameter values. Each particle also has a velocity vector that allows it to explore the multi-dimensional solution space in search of the objective function optima. In the case of a wireless network, the particles search a multi-dimensional network parameter space in search of the optimal global network utility. Each particle i keeps track of the position vector $\vec{y}_i$ that represents the current best solution it has found. Another position vector $\vec{y}_g$ is used to store the current global best solution found by all of the particles. The velocity and position vectors for particle i are then changed probabilistically according to the following set of simple dynamic update equations:

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_i(t)]$$

$$\vec{x}_i(t+1) = \vec{x}_i(t) + \vec{v}_i(t+1)$$

where $\vec{x}_i(t)$ and $\vec{v}_i(t)$ are the position and velocity vectors at time t of the ith particle and $c_1$ and $c_2$ are parameters that weight the influence of the "current best" and "global best" terms. Furthermore, w is a momentum constant that prevents premature convergence. Finally, $q_1$ and $q_2$ are random variables which allow the particles to better explore the multi-dimensional solution space. These dynamics cause the swarm to concentrate on promising regions of solution space very quickly with very sparse sampling of the solution space. Although PSO is a relatively new area of research, extensive literature already exists which documents its efficiency and robustness as an optimization tool for high dimensional spaces. Additionally, both theoretical analysis and practical experience show that PSO converges on good solutions for a wide range of parameter values. The evolution of good solutions is stable in PSO because of the way solutions are represented (e.g. small changes in the representation result in small changes in the solution). Finally, simulations have shown that the number of particles and iterations required are relatively low and scale slowly with the dimensionality of the solution space.

(3) Specific Details

The present invention relates to a distributed network optimization system implementing DPSO that allows multiple radios, or nodes, to cooperate in searching efficiently for a set of parameter values that optimizes overall network performance. DPSO is a novel approach to implementing PSO for distributed wireless network optimization. Wireless networks need a distributed method that allows each node to cooperate with other nodes in optimizing the total performance of the network without knowledge of the internal states or parameter values associated with other nodes and without a master control node. DPSO accomplishes this by using a set of software agents, or particles, in which each particle is individually distributed across multiple nodes in a multi-dimensional network parameter space. The particles are distributed in the sense that only that portion of each particle responsible for a specific node's performance resides at that node. The nodes process their portions of the particles independently, but in coordination, to obtain a local utility value for each particle. Non-limiting examples of local utility include local signal to noise ratio (SNR), local traffic flow, or physical measurements such as signal strength and power utilization.

Parallel processing of the portions of the particles is accomplished with the use of synchronized clocks. Each node updates its portion of each particle (e.g., its parameter values) at a pre-agreed time for that particle. Each parameter value is represented as an orthogonal dimension in the solution space. Local utility values for each particle, as well as a time stamp representing the time the particle was processed, or sampled, are shared amongst all of the nodes. In a system which implements DPSO, each node shares its local utility values with other nodes using efficient data routing with low communication costs. By using time synchronization to ensure that the local utility values are sampled at the same time, each node can then calculate the global network utility for the network corresponding to the time stamp for each of the particles. The global network utility value calculated at each node takes into account the local utilities of all connected nodes. A policy must be predefined that specifies how the local utilities are to be weighted and combined. The global network utility, which is a measure of global network performance, is used as the objective function for the DPSO optimizer module.

As an example, the P particles are distributed across the network, where P is the total number of particles. Each of the N nodes calculates the component of the particle velocity update that lies in the subspace formed by its own parameter values, where N is the total number of nodes. This process is then repeated for all P particles. As each of the nodes cycles through the virtual distributed particles in synchronization, the global solution space is sampled, and PSO particle dynamics is utilized to estimate a better set of global network parameter values. The required accuracy of the clock synchronization is set by the rate of change of network conditions and which network parameters are being controlled.

Once global network utility values are obtained for each particle, each node can calculate the "current best" and "global best" parameter values for each particle which represent the particle's position in a node-specific subspace and make the correct update to the component of the particle velocity that corresponds to the node parameters. There is no need to communicate or share these parameter values between nodes, because each node only needs to know its own local parameter values. DPSO then acts to optimize the global network performance by adjusting the local network control parameters. The global network utility is then recalculated, completing a global feedback loop. A non-limiting example of an application of the present invention is global optimization of communication networks, both wired and wireless. However, as can be appreciated by one skilled in the art, the network optimization system may be applied to any type of network model. Non-limiting examples of applications include mobile ad hoc wireless networks, sensor networks, collaborative beamforming using distributed wireless nodes, vehicle-to-vehicle networking, and networking of robotic vehicles.

The key observation which makes this system possible is that the PSO velocity vector update equations can be written as a set of independent scalar equations, one for each dimension of the solution space. DPSO update equations are identical to those for PSO, except that they are factored by node and local parameter indices. Additionally, each node updates particle coordinates only for those dimensions of the multi-dimensional network parameter space controlled by the node. In other words, by calculating particle dynamics only in its own subspace, each node can cooperate with other nodes in the optimization of the global network utility. Each node updates the positions of the particles in its node-specific subspaces according to the following technique:

$$v_{pnd}(t+1) = wv_{pnd}(t) + c_1 q_1 [y_{pnd}(t) - x_{pnd}(t)] + c_2 q_2 [y_{nd}^G(t) - x_{pnd}(t)]$$

$$x_{pnd}(t+1) = x_{pnd}(t) + v_{pnd}(t+1)$$

where p is the particle index, n is the node index, and d is the local parameter index, and each index represents a dimension of the multi-dimensional network parameter space. The parameter values controlled by each node form a subspace of the network solution space. Therefore, the velocity of each particle in a subspace can be updated by a node without regard to the parameters of other nodes. Other nodes affect the update only through the local utility values. In this way, a "virtual" swarm is formed that is distributed across the network.

FIG. 1 illustrates a model of PSO depicting a multi-dimensional parameter solution space 100 through which particles, for example particle $P_i$ 102, travel in search of the objective function optima. As described previously, the positions of the particles represent vectors of multi-node parameter values in the solution space 100. In addition, each of the particles, including $P_i$ 102, has a velocity vector 104 that allows it to explore the multi-dimensional parameter solution space 100.

Figure 2:
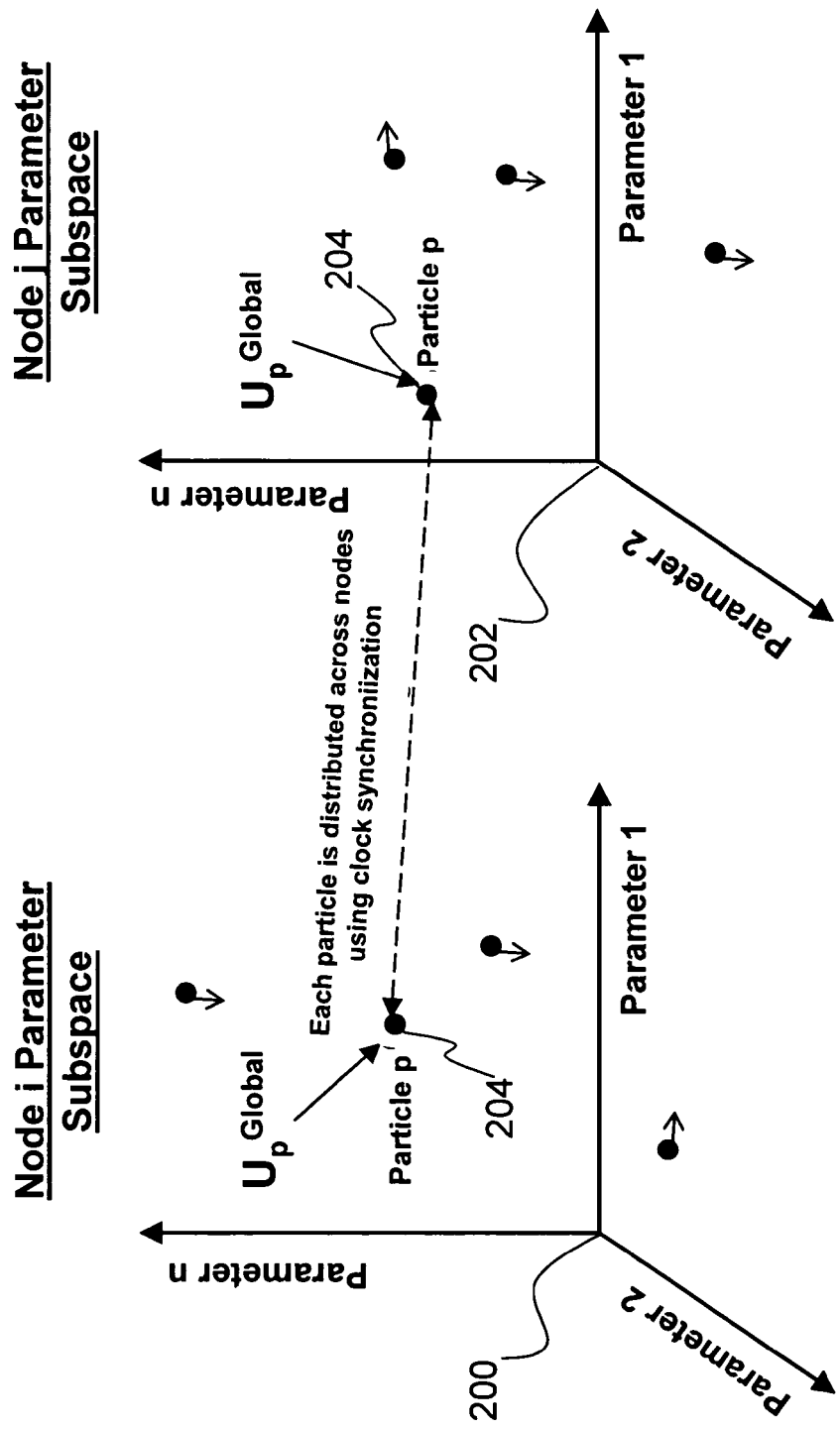
FIG. 2 is an illustration of node-specific parameter subspaces according to the present invention.

FIG. 2 illustrates a schematic of two node-specific parameter subspaces, node i 200 and node j 202. Particle p 204 is distributed across node i 200 and node j 202. Using DPSO, all of the particles run on all of the nodes, but each node 200 and 202 handles only the particle coordinates that represent the node's own local parameters. Thus, the only communication between nodes that must occur for DPSO to function is the sharing of local node utility values so that the global or cluster utility can be calculated at each node. By using synchronized node clocks, this can be accomplished without sharing particle position information, or parameter values, between nodes. Only local utility values for the set of particles need to be shared, which can be done using only nearest neighbor transmissions and small message sizes resulting in low cost, efficient data routing. By utilizing well-known routing methods, at most two messages per node need to be transmitted to update the distributed swarm. The average number of node utilities in each message is NP/2, where N is the number of nodes and P is the number of particles. However, this estimate assumes that all of the utilities change at every update time. In a desired aspect, the average message size can be greatly reduced by sending an acknowledgement rather than the utility value if the utility value is unchanged.

PSO has been used successfully in many problems with more than one hundred dimensions with tens to hundreds of particles. P scales very weakly with dimensionality of the problem, and PSO performance degrades gracefully as P is reduced. In a desired aspect, DPSO is able to handle networks at least as large as one hundred nodes, each with two parameters. Alternatively, the networks may comprise twenty nodes, each with ten parameters. For very large networks in which nodes may have minimal impact on distant nodes, it may be more efficient to divide the network into clusters with separate swarms running on each cluster. Node dropping and joining can be handled gracefully since particle positions in other node subspaces are not affected by the addition or subtraction of nodes. Furthermore, DPSO implements node-level and network-level priorities and policies, including soft and hard constraints on performance metrics, through the local and global network utility functions. Different policies may be implemented for different nodes, if needed. In addition, constraints on parameter values can be applied by limiting the distributed particles to allowed regions in each node-specific subspace.

Figure 3:
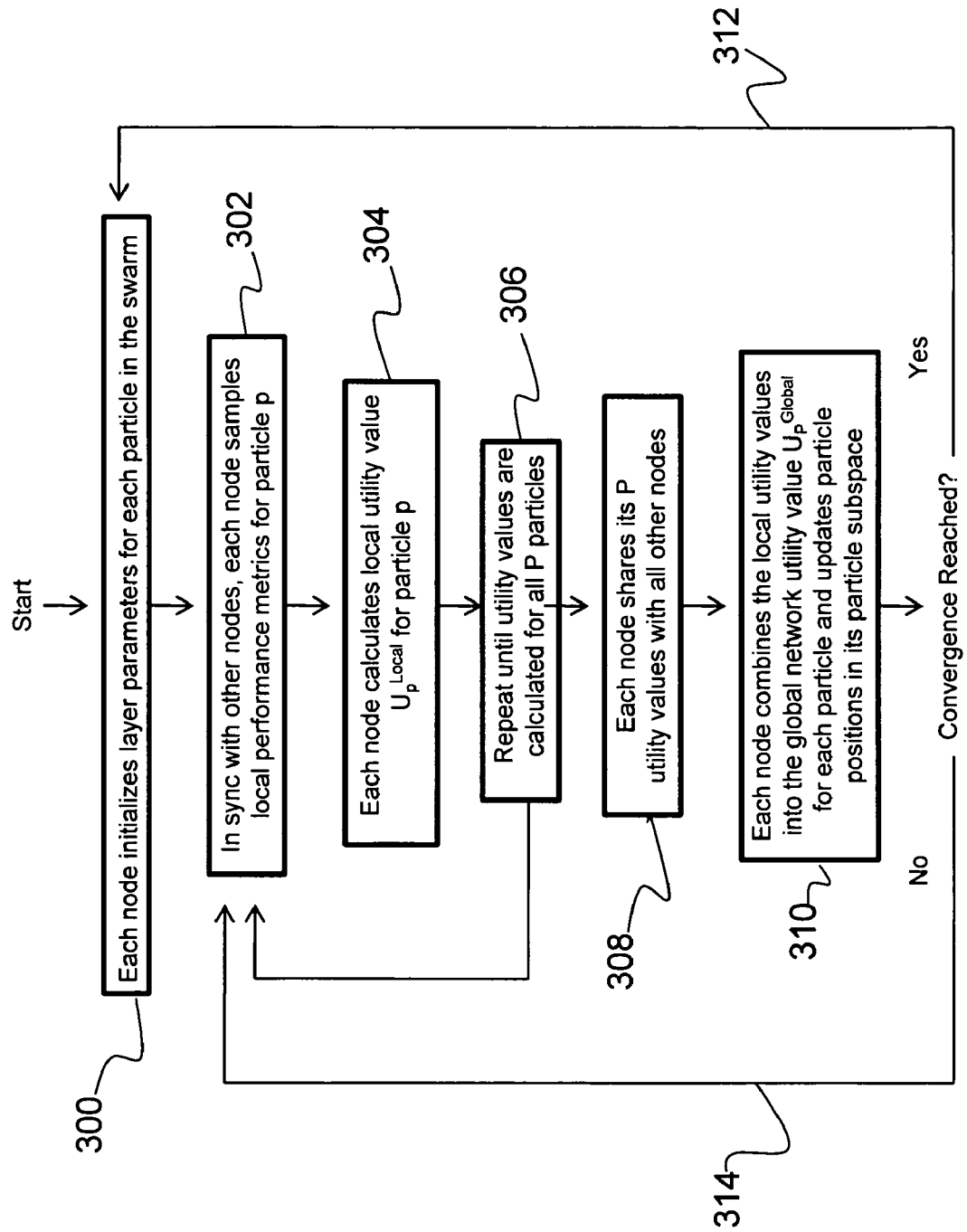
FIG. 3 illustrates a system concept overview of the present invention.

FIG. 3 illustrates a system concept overview of DPSO. First, each node initializes layer parameter values for each particle in the swarm 300. Then, each node samples, or processes, local performance metrics for particle p in synchronization with other nodes 302. Next, each node calculates the local utility value ($U_p^{Local}$) for particle p 304. This process is repeated until all local utility values are calculated for all P particles 306, where P is the total number of particles. Each node then shares its P local utility values with all other nodes 308. Finally, each node combines the local utility values into the global network utility value ($U_p^{Global}$) for each particle and updates particle positions in its parameter subspace 310 accordingly. If convergence is reached 312, the process begins again with each node initializing layer parameters for each particle in the swarm 300. If convergence is not reached 314, then each node continues to sample local performance metrics for the particles in sync with one another 302 and so forth until convergence is reached 312.

Figure 4:
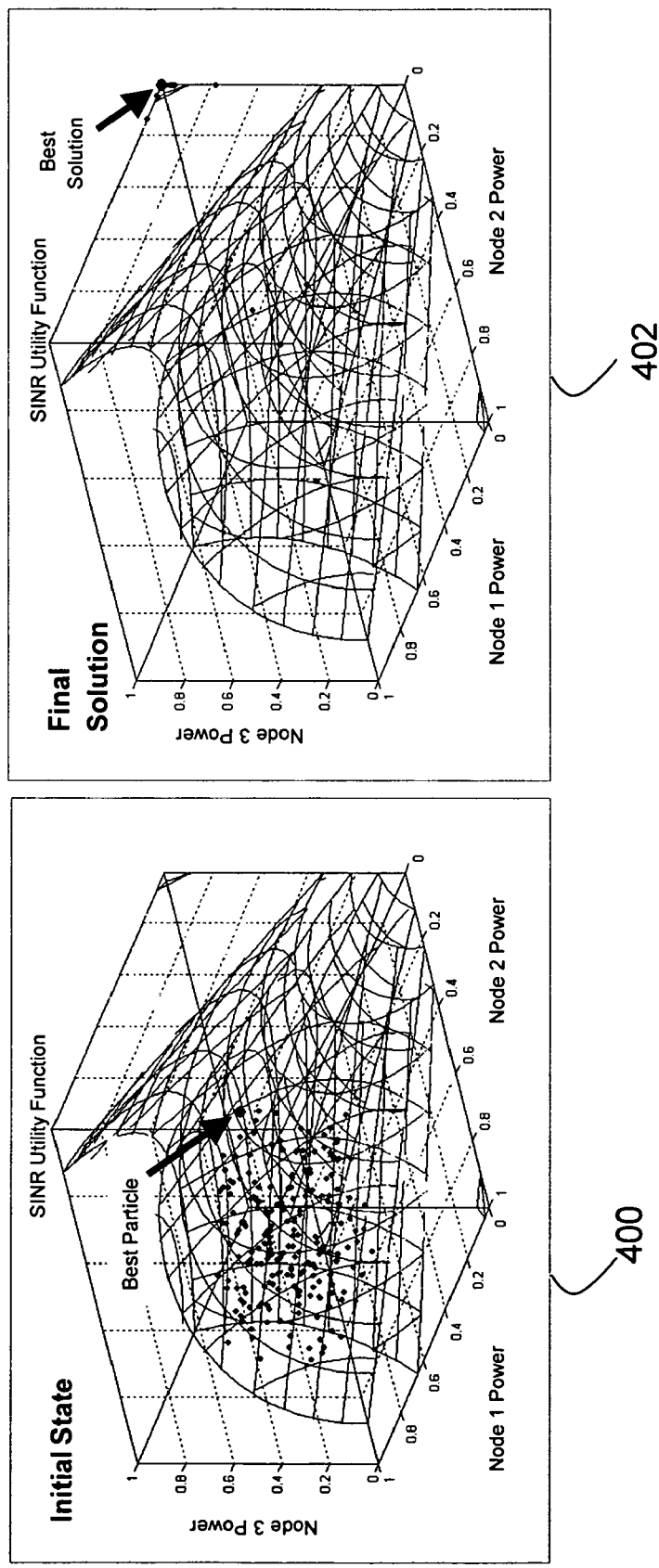
FIG. 4 illustrates a simulation of the operation of distributed particle swarm optimization according to the present invention.

In order to illustrate a non-limiting example of operation of DPSO, a simulation, shown in FIG. 4, was performed for a simple power allocation model. As can be appreciated by one skilled in the art, the same approach can be used for optimizing a wide range of wireless network parameters. In this simulation example, the global network utility was given by the following expression:

$$U = \begin{cases} \sum_k SNR_k = \sum_k \frac{G_{kk} P_k}{\sum_{m \neq k} G_{km} P_m + v_k} & \text{if } SNR_k^{min} < SNR_k < SNR_k^{max} \text{ for all } k \\ 0 & \text{otherwise} \end{cases}$$

where $P_k$ is the power of node k, $SNR_k$ is the signal to interference plus noise ratio for node k, $G_{km}$ is the channel factor between nodes k and m, and $v_k$ is the noise level at node k. The global utility measure U incorporates the constraint that the SNR at each node must be maintained in a certain range. Simulation results for a three node network are shown in FIG. 4. The plot displays the initial particle positions in solution space 400 and the converged optimum solution 402. Convergence occurred after only five iterations in the simulation.

Figure 5:
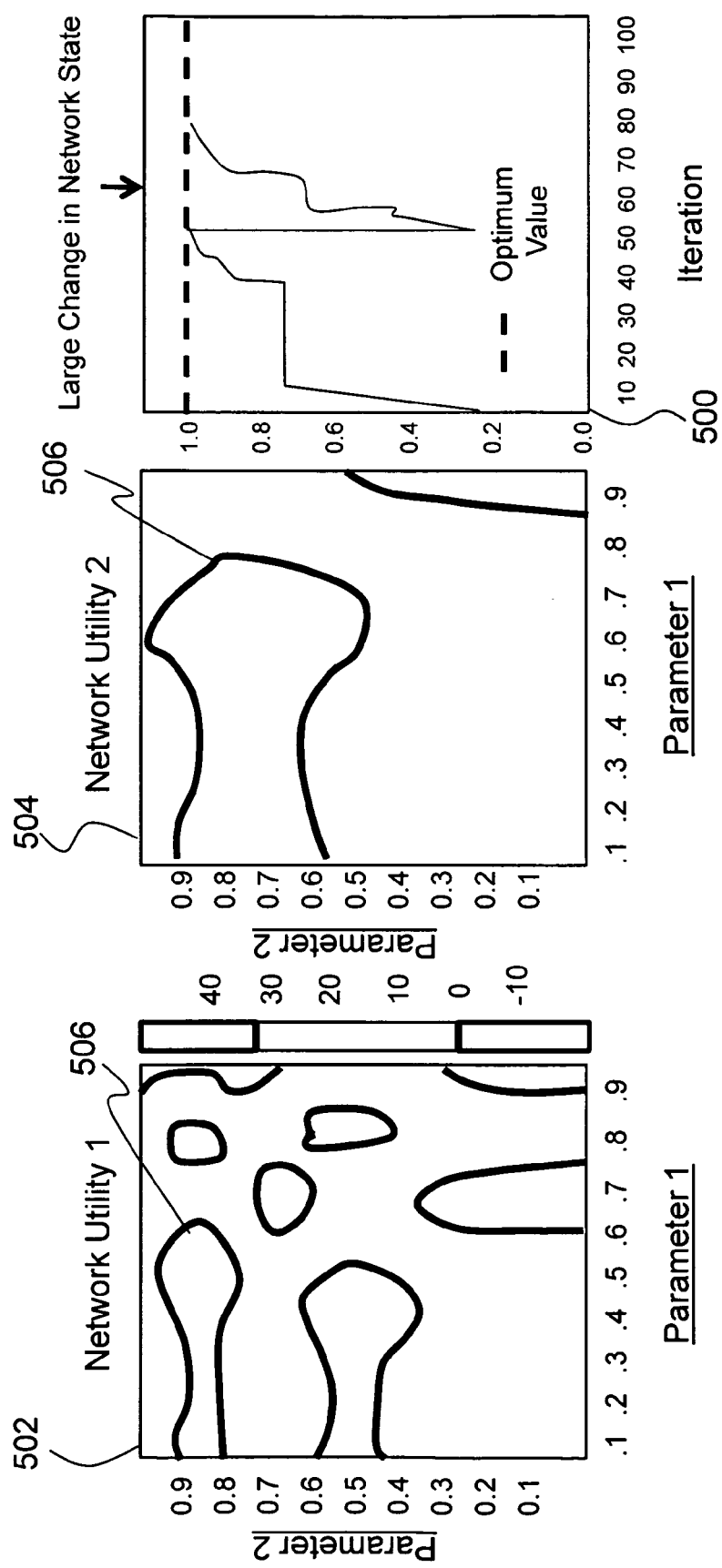
FIG. 5 illustrates a simulation of the operation of distributed particle swarm optimization for two network states according to the present invention.

In a simulation shown in FIG. 5, the robustness of DPSO in handling high-dimensional non-convex and noisy synthetic global network utility functions is shown. The network utility function was artificially switched from one state to another midway through the simulation, as shown in the network global utility plot 500 in order to explore how DPSO responds to such situations. Two-dimensional projections of the utility functions corresponding to the two network states 502 and 504 are also illustrated. The DPSO particle positions at one time instant are shown for the two states 502 and 504. The best performing particle is shown as a larger dot 506. The fifteen-dimensional utility functions were designed to be non-convex and noisy. As shown in the network global utility plot 500, the DPSO solution initially quickly converges to the optimum parameter values. After the network switches states, DPSO quickly reacts and converges to the new optimum parameters.

Figure 6:
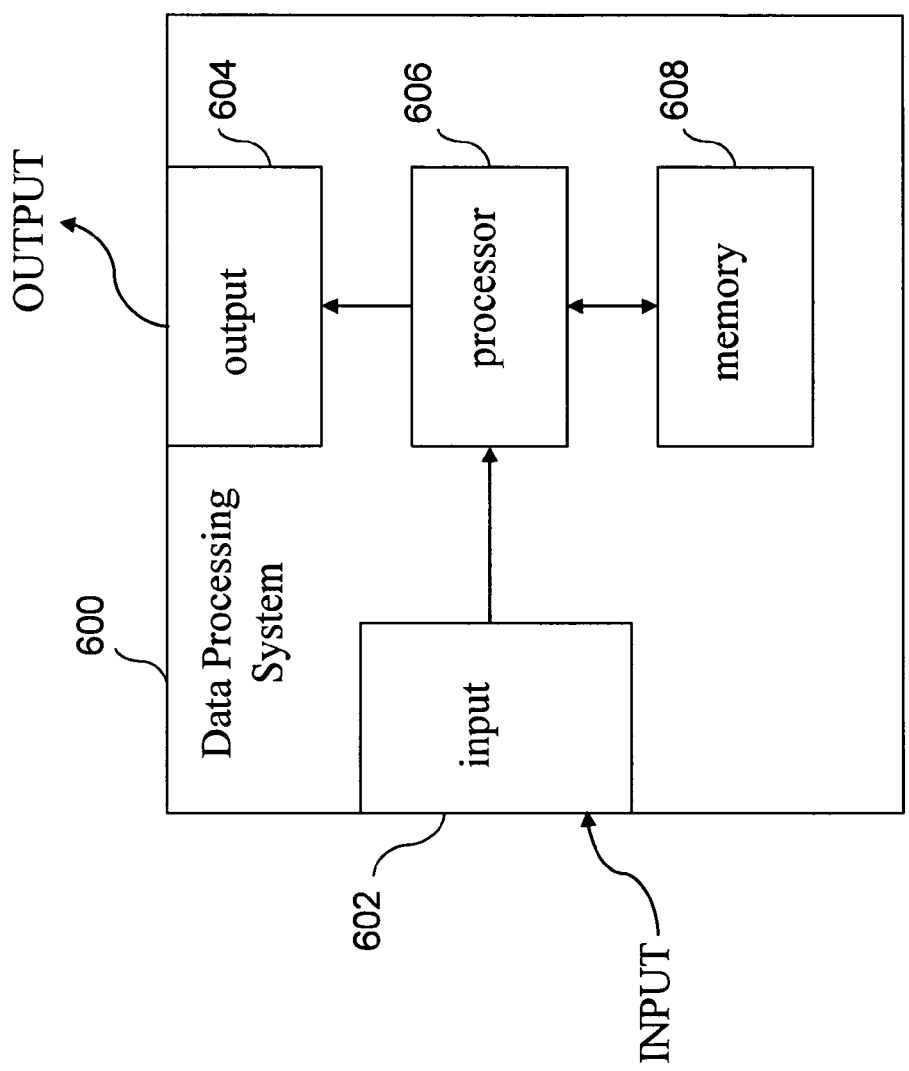
FIG. 6 is an illustration of a data processing system according to the present invention.

FIG. 6 illustrates a block diagram depicting components of a data processing system 600 (e.g., computer) incorporating the operations of the method and technique described above. The technique utilizes a data processing system 600 for storing computer executable instructions for causing a processor (or processors) to carry out the operations of the above described technique. The data processing system 600 comprises an input 602 for receiving information from a user. Information received may include input from devices such as cameras, scanners, keypads, keyboards, microphone, other peripherals such as storage devices, other programs, etc. The input 602 may include multiple "ports." An output 604 is connected with a processor 606 for providing information for transmission to other data processing systems, to storage devices, to display devices such as monitors, to generating information necessary for delivery, and to other mechanisms for presentation in user-usable forms. The input 602 and the output 604 are both coupled with the processor 606, which may be a general-purpose computer processor or a specialized processor designed specifically for use with the present invention. The processor 606 is coupled with a memory 608 to permit storage of data and software to be manipulated by commands to the processor 606.

Figure 7:
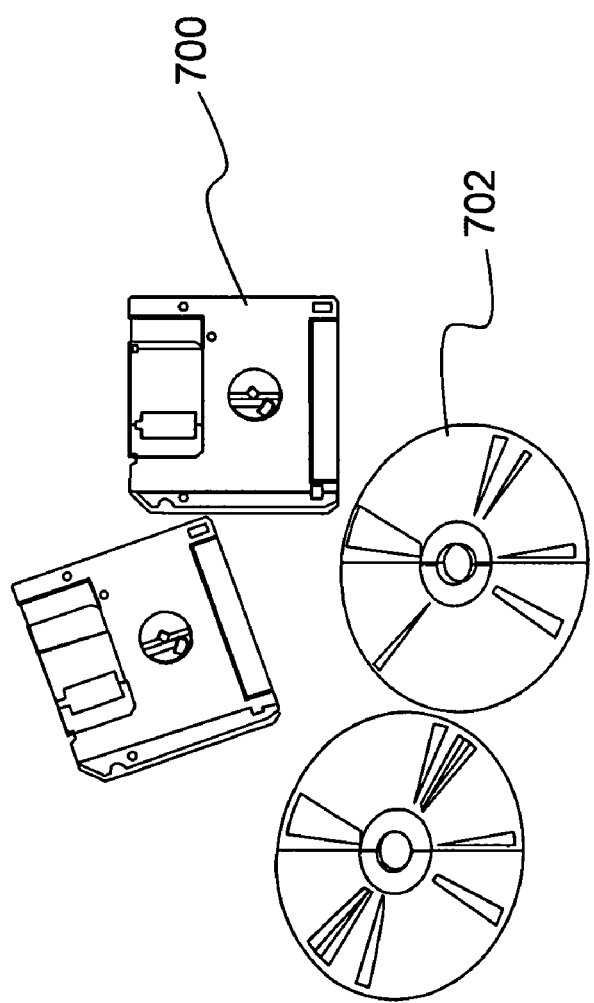
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code stored on any compatible computer readable medium.

(4) Conclusion

The present invention describes the concept of utilizing distributed particle swarm optimization (DPSO) for wireless network optimization in order to create a distributed system without central control. By factoring the network parameter space into node-specific particle swarm optimization (PSO) subspaces, PSO can be adapted for distributed wireless network optimization. DPSO is a novel approach to implementing PSO that allows multiple nodes to cooperate in searching efficiently for a set of parameter values which optimize overall network performance, rather than the traditional "greedy" approach where each node acts to optimize only its own performance. Additionally, a DPSO technique for updating particle positions written as a set of independent scalar equations was described, wherein each node updates particle coordinates only for those dimensions of parameter space controlled by the node. Finally, simulations disclosed herein demonstrate the robustness of DPSO in handling high-dimensional, non-convex, and noisy synthetic global network utility functions.

What is claimed is:

1. A distributed network optimization system, the distributed network optimization system comprising one or more processors and a memory, the memory storing computer code which, when executed by the one or more processors, cause the one or more processors to perform operations of:

configuring a plurality of software agents to operate as a cooperative swarm in a network having a plurality of nodes to locate an objective function optima, the network comprising a multi-dimensional network parameter space, wherein each software agent is assigned an initial velocity vector to explore the multi-dimensional network parameter space, where each software agent is configured to perform at least one iteration, the at least one iteration being a search in the multi-dimensional network parameter space for a potential objective function optima where each software agent keeps track of a first position vector representing a current best solution that the software agent has identified, and a second position vector used to store a current global best solution among all the plurality of software agents, with each of the initial velocity, first position, and second position vectors changing probabilistically;

wherein each software agent calculates local utility values representing a set of local performance values at each node;

configuring each of the plurality of software agents to be individually distributed across the plurality of nodes; and processing a portion of each software agent at each node, such that each node processes its portion of the software agent independently to obtain information regarding a local performance of the software agent based on the set of local performance values.

2. A distributed network optimization system as set forth in claim 1, wherein the multi-dimensional network parameter space is factored into node-specific subspaces.

3. A distributed network optimization system as set forth in claim 2, wherein the portions of the software agents are processed at each node in parallel using synchronized node clocks.

4. A distributed network optimization system as set forth in claim 3, wherein each node shares the local utility values for its software agents with all other nodes.

5. A distributed network optimization system as set forth in claim 4, wherein each node computes a global network utility value for each software agent based on sharing of local utility values.

6. A distributed network optimization system as set forth in claim 5, wherein each node updates the first and second position vectors of the software agents in its node-specific subspaces based on the global network utility value.

7. A distributed network optimization system as set forth in claim 6, wherein each node updates the positions of the software agents in its node-specific subspaces according to the following technique:

$$v_{pnd}(t+1) = wv_{pnd}(t) + c_1 q_1 [y_{pnd}(t) - x_{pnd}(t)] + c_2 q_2 [y_{nd}^G(t) - x_{pnd}(t)]$$

$$x_{pnd}(t+1) = x_{pnd}(t) + v_{pnd}(t+1)$$

where $x(t)$ and $v(t)$ are the position and velocity vectors at time $t$, $y$ represents the current best solution found, $y^G$ represents the current global best solution found, $c_1$ and $c_2$ are parameters that weight the influence of their respective terms, $w$ is a momentum constant that prevents premature convergence, and where $q_1$ and $q_2$ are random variables that allow the software agents to better explore the multi-dimensional network parameter space, and where $p$ is a particle index, $n$ is a node index, and $d$ is a local parameter index, wherein each index represents a dimension of the multi-dimensional network parameter space.

8. A distributed network optimization system as set forth in claim 7, wherein each node updates the positions of the software agents in its node-specific subspaces in parallel with the other nodes in order to optimize global network utility.

9. A computer-implemented method for distributed network optimization comprising:

configuring a plurality of software agents to operate as a cooperative swarm in a network having a plurality of nodes to locate an objective function optima, the network comprising a multi-dimensional network parameter space, wherein each software agent is assigned an initial velocity vector to explore the multi-dimensional network parameter space, where each software agent is configured to perform at least one iteration, the at least one iteration being a search in the multi-dimensional network parameter space for a potential objective function optima where each software agent keeps track of a first position vector representing a current best solution that the software agent has identified, and a second position vector used to store a current global best solution among all the plurality of software agents, with each of the initial velocity, first position, and second position vectors changing probabilistically;

wherein each software agent calculates local utility values representing a set of local performance values at each node;

configuring each of the plurality of software agents to be individually distributed across the plurality of nodes; and processing a portion of each software agent at each node, such that each node processes its portion of the software agent independently to obtain information regarding a local performance of the software agent based on the set of local performance values.

10. A method of distributed network optimization as set forth in claim 9, further comprising an act of factoring the multi-dimensional network parameter space into node-specific subspaces.

11. A method for distributed network optimization as set forth in claim 10, further comprising an act of processing the portions of the software agents at each node in parallel using synchronized node clocks.

12. A method for distributed network optimization as set forth in claim 11, further comprising an act of each node sharing the local utility values for its software agents with all other nodes.

13. A method for forming a distributed network optimization system as set forth in claim 12, further comprising an act of each node computing a global network utility value for each software agent based on sharing of local utility values.

14. A method for distributed network optimization as set forth in claim 13, further comprising an act of each node updating the first and second position vectors of the software agents in its node-specific subspaces based on the global network utility value.

15. A method for distributed network optimization as set forth in claim 14, further comprising an act of each node updating the positions of the software agents in its node-specific subspaces according to the following technique:

$$v_{pnd}(t+1)=wv_{pnd}(t)+c_1q_1[y_{pnd}(t)-x_{pnd}(t)]+c_2q_2[y_{nd}^G(t)-x_{pnd}(t)]$$

$$x_{pnd}(t+1)=x_{pnd}(t)+v_{pnd}(t+1)$$

where x(t) and v(t) are the position and velocity vectors at time t, y represents the current best solution found, $y^G$ represents the current global best solution found, $c_1$ and $c_2$ are parameters that weight the influence of their respective terms, w is a momentum constant that prevents premature convergence, and where $q_1$ and $q_2$ are random variables that allow the software agents to better explore the multi-dimensional network parameter space, and where p is a particle index, n is a node index, and d is a local parameter index, wherein each index represents a dimension of the multi-dimensional network parameter space.

16. A method for distributed network optimization as set forth in claim 15, wherein each node updates the positions of the software agents in its node-specific subspaces in parallel with the other nodes in order to optimize global network utility.

17. A computer program product for distributed network optimization, the computer program product comprising computer-readable instructions stored on a non-transitory computer-readable medium that are executable by a computer having a processor for causing the processor to perform operations of:
    configuring a plurality of software agents to operate as a cooperative swarm in a network having a plurality of nodes to locate an objective function optima, the network comprising a multi-dimensional network parameter space, wherein each software agent is assigned an initial velocity vector to explore a multi-dimensional network parameter space, where each software agent is configured to perform at least one iteration, the at least one iteration being a search in the multi-dimensional network parameter space for a potential objective function optima where each software agent keeps track of a first position vector representing a current best solution that the agent has identified, and a second position vector used to store a current global best solution among all the plurality of software agents, with each of the initial velocity, first position, and second position vectors changing probabilistically;
    wherein each software agent calculates local utility values representing a set of local performance values at each node;
    configuring each of the plurality of software agents to be individually distributed across a plurality of nodes; and
    processing a portion of each software agent at each node, such that each node processes its portion of the software agent independently to obtain information regarding a local performance of the software agent based on the set of local performance values.

18. A computer program product for distributed network optimization as set forth in claim 17, further comprising computer-readable instructions for factoring the multi-dimensional network parameter space into node-specific subspaces.

19. A computer program product for distributed network optimization as set forth in claim 18, further comprising computer-readable instructions for processing the portions of the software agents at each node in parallel using synchronized node clocks.

20. A computer program product for distributed network optimization as set forth in claim 19, further comprising computer-readable instructions for each node to share the local utility values for its software agents with all other nodes.

21. A computer program product for distributed network optimization as set forth in claim 20, further comprising computer-readable instructions for each node to compute a global network utility value for each software agent based on sharing of local utility values.

22. A computer program product for distributed network optimization as set forth in claim 21, further comprising computer-readable instructions for each node to update the first and second position vectors of the software agents in its node-specific subspaces based on the global network utility value.

23. A computer program product for distributed network optimization as set forth in claim 22, further comprising computer-readable instructions for each node to update the positions of the software agents in its node-specific subspaces according to the following technique:

$$v_{pnd}(t+1)=wv_{pnd}(t)+c_1q_1[y_{pnd}(t)-x_{pnd}(t)]+c_2q_2[y_{nd}^G(t)-x_{pnd}(t)]$$

$$x_{pnd}(t+1)=x_{pnd}(t)+v_{pnd}(t+1)$$

where x(t) and v(t) are the position and velocity vectors at time t, y represents the current best solution found, $y^G$ represents the current global best solution found, $c_1$ and $c_2$ are parameters that weight the influence of their respective terms, w is a momentum constant that prevents premature convergence, and where $q_1$ and $q_2$ are random variables that allow the software agents to better explore the multi-dimensional network parameter space, and where p is a particle index, n is a node index, and d is a local parameter index, wherein each index represents a dimension of the multi-dimensional network parameter space.

24. A computer program product for distributed network optimization as set forth in claim 23, wherein each node updates the positions of the software agents in its node-specific subspaces in parallel with the other nodes in order to optimize global network utility.

* * * * *